US006947139B2

(12) United States Patent
Lee et al.

(10) Patent No.: US 6,947,139 B2
(45) Date of Patent: Sep. 20, 2005

(54) SIMULTANEOUS OPTICAL ISOLATION AND CHANNEL MONITORING SYSTEM

(75) Inventors: San-Liang Lee, Taipei (TW); Chun-Liang Yang, Sanshing Shiang (TW)

(73) Assignee: National Taiwan University of Science and Technology, Taipei (TW)

(*) Notice: Subject to any disclaimer, the term of this patent is extended or adjusted under 35 U.S.C. 154(b) by 252 days.

(21) Appl. No.: 10/441,525

(22) Filed: May 21, 2003

(65) Prior Publication Data

US 2004/0212800 A1 Oct. 28, 2004

(51) Int. Cl.[7] .................................................. G01J 4/00
(52) U.S. Cl. ......................... 356/364; 356/73.1; 385/12
(58) Field of Search ............................... 356/364, 73.1; 385/12, 15

(56) References Cited

U.S. PATENT DOCUMENTS 5,371,597 A * 12/1994 Favin et al. ................ 356/364
6,339,492 B1 1/2002 Terahara et al.
6,369,562 B2 * 4/2002 Ito et al. ..................... 356/369
6,421,131 B1 7/2002 Miller
6,650,667 B2 * 11/2003 Nasu et al. ................... 372/32
6,661,941 B1 * 12/2003 Yao ............................ 385/15
6,762,837 B2 * 7/2004 Iwata ......................... 356/364

* cited by examiner

*Primary Examiner*—Zandra V. Smith
*Assistant Examiner*—Juan D. Valentin, II
(74) *Attorney, Agent, or Firm*—Volpe and Koenig, P.C.

(57) ABSTRACT

A simultaneous optical isolation and channel monitoring system for monitoring a channel of an incident light is provided. The system includes an optical isolator for receiving an incident light so as to isolate an interference of backward light into the cavity of laser source or an optical amplifier, wherein after passing through the optical isolator, the incident light has a different polarization state output changing with a wavelength thereof, a beam splitter connected to the optical isolator for separating the light into a light to output and a light for monitoring signal, a linear polarizer connected to the beam splitter for filtering a quantity of signal from the monitored light, and a photodetector connected to the linear polarizer for detecting the quantity of signal generated from the monitored light so as to monitor the channel.

11 Claims, 9 Drawing Sheets

SIMULTANEOUS OPTICAL ISOLATION AND CHANNEL MONITORING SYSTEM

FIELD OF THE INVENTION

This invention relates to a channel monitoring system, and more particularly to a simultaneous optical isolation and channel monitoring system.

BACKGROUND OF THE INVENTION

Along with the development of the network, the optical fiber communication becomes more and more important. In the optical fiber communication, not only the loss during transmission thereof is low also the transmission capacity is high. When cooperating with a DWDM (Dense Wavelength Division Multiplexing) system, an optical fiber can simultaneously transmit sixteen, thirty-two, or even more wavelengths. Since the spacing of the wavelengths is so close together, the shift of the wavelength will cause a serious crosstalk. Because of this situation, a wavelength monitoring of a laser source becomes very important. Although wavelength monitoring systems have been applied in the commercial product, they can, usually only monitor single wavelength and are unable to monitor the mode-hopping of the laser.

In the DWDM network system, a tunable laser is a key component for using as, for example, a spare source and a fast wavelength-switching device etc. Therefore, the wavelength monitoring of a tunable laser has to cope with multiple output wavelengths and the required tuning speed simultaneously.

Fabry-Perot (FP) etalons have been commercially used for wavelength control in the tunable lasers, but the FP etalon cannot distinguish among different channels due to a periodic wavelength characteristic thereof and thus cannot monitor the mode-hopping and incomplete tuning problem in the laser. Furthermore, employing the tunable FP etalon or an array waveguide grating (AWG) as a monitoring module will be limited by a response speed or an expensive cost. Even though a thin film filter is employed for monitoring the channel, the waveband for monitoring the channel is unchangeable without moving the filter.

As described in U.S. Pat. No. 6,339,492 B1, a tunable optical filter having a phase-shifter and a rotator is disclosed. The tunable optical filter includes a first linear polarizer, a birefringent plate, a Faraday rotator, and a second linear polarizer, wherein an order of arrangement of the birefringent plate and the Faraday rotator is exchangeable. Another aspect thereof is to additionally include a variable phase-shifter therein for achieving a shift of the spectral transmittance. In this patent, it is considered an optical tunable filter, and it doesn't involve the function of optical isolation.

Another description in U.S. Pat. No. 6,421,131 B1, a birefringent interferometer system is described. The birefringent interferometer system uses liquid crystal cells to produce orthogonal-polarization optical path differences (OPD). Further, retarders are also incorporated to extend the range of OPD. This patent is mainly applied in an optical spectral measuring system, however, also doesn't act as an optical isolator.

Because of the drawbacks described above, the applicant keeps on carving unflaggingly to develop a "simultaneous optical isolation and channel monitoring system" through wholehearted experience and research.

SUMMARY OF THE INVENTION

It is an object of the present invention to provide a system has functions of simultaneously optical isolating and channel monitoring.

It is another object of the present invention to provide an optical isolator having a birefringent characteristic and cooperating with a linear polarizer for monitoring a channel.

It is further another object of the present invention to provide a simultaneous optical isolation and channel monitoring system which has a simple construction and a waveband thereof can be easily adjusted.

According to an aspect of the present invention, a simultaneous optical isolation and channel monitoring system for monitoring an incident light includes an optical isolator for receiving the incident light so as to isolate an interference of backward light into the cavity of laser source or an optical amplifier, wherein after passing through the optical isolator, the light changes its polarization state according to the wavelength of incident light, a beam splitter connected to the optical isolator for separating the light into a light to output and a light for monitoring signal, a linear polarizer connected to the beam splitter for filtering a quantity of the specific polarization from the monitored light, and a photodetector connected to the linear polarizer for detecting the specific polarization so as to monitor the channel.

Preferably, the incident light is generated by a tunable laser.

Preferably, the optical isolator has a birefringent characteristic.

Preferably, the filtered polarization is one of horizontal and vertical ones.

Preferably, the filtered polarization is an arbitrary orientation.

Preferably, the photodetector is a photodiode.

Preferably, the system further includes a polarization controller and a component having linear polarizing function set in front of the optical isolator for being applied in an OADM (Optical Add/Drop Multiplexer) and a receiver end.

Preferably, the system further includes a polarization controller set in front of the optical isolator for being applied in an OADM and a receiver end.

In accordance with another aspect of the present invention, a simultaneous optical isolation and channel monitoring system for monitoring an incident light includes an optical isolator for receiving the incident light so as to isolate an interference of backward light into the cavity of laser source or an optical amplifier, wherein after passing through the optical isolator, the light changes its polarization state according to the wavelength of incident light, a beam splitter connected to the optical isolator for separating the light into a light to output and a light for monitoring signal, a polarization beam splitter connected to the beam splitter for filtering two quantities of orthogonal polarizations from the monitored light, and two photodetectors connected to the polarization beam splitter for detecting the two quantities of orthogonal polarizations so as to monitor the channel.

Preferably, the two photodetectors are respectively a photodiode.

In accordance with another further aspect of the present invention, a system of simultaneous optical isolation and channel monitor for monitoring a channel of an incident light includes an optical isolator for receiving the incident light so as to isolate an interference of backward light into the cavity of laser source or an optical amplifier; a wave plate, a phase-shifter or a polarization rotator connected to the optical isolator to modify or slightly adjust the spectral waveband and characteristic of channel monitoring, a beam splitter connected to the back for separating the incident light into a light to output and a light for monitoring signal, a linear polarizer connected to the beam splitter for filtering a quantity of the specific polarization from the monitored light, and a photodetector connected to the linear polarizer for detecting the specific polarization so as to monitor the channel.

After the incident light passes through the optical isolator, the monitored light changes its polarization state according to the wavelength of incident light.

In accordance with further another aspect of the present invention, a system of simultaneous optical isolation and channel monitor for monitoring a channel of an incident light includes an optical isolator for receiving the incident light so as to isolate an interference of backward light into the cavity of laser source or an optical amplifier, a beam splitter connected to the optical isolator for separating the light into a light to output and a light for monitoring signal; a wave plate, a phase-shifter or a polarization rotator connected to the beam splitter to modify or slightly adjust the spectral waveband and characteristic of monitored light , a linear polarizer connected to the back for filtering a quantity of the specific polarization from the monitored light, and a photodetector connected to the linear polarizer for detecting the specific polarization so as to monitor the channel.

In accordance with an additional aspect of the present invention, a simultaneous optical isolation and channel monitoring system for monitoring a channel of an incident light includes an optical isolator for receiving the light input so as to isolate an interference of backward light into the cavity of laser source or an optical amplifier, a beam splitter connected to the optical isolator for separating the light into a light to output and a light for monitoring signal, an optical circulator and a reflective linear polarizer connected to the beam splitter for filtering and separating the two orthogonal polarizations from the monitored light, one photodetector connected to the optical circulator for detecting the reflected polarization, and the other one photodetector connected to the reflective linear polarizer for detecting the transmitted polarization from the monitored light so as to monitor the channel.

Preferably, the system further includes a wave plate, a phase-shifter or a polarization rotator set in front of the beam splitter to modify or slightly adjust the spectral waveband and characteristic of monitored light.

Preferably, the system further includes a wave plate, a phase-shifter or a polarization rotator set in back of the beam splitter to modify or slightly adjust the spectral waveband and characteristic of monitored light.

Preferably, the system further includes a reflective linear polarizer set between the optical circulator and the first photodetector.

Preferably, the first photodetector is a photodiode.

Preferably, the second photodetector is a photodiode.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention provides a channel monitoring system and technique for monitoring a fast tunable laser which includes an optical isolator and an optical polarizer, wherein the optical isolator has a birefringent characteristic and the optical polarizer is a linear polarizer. Because the optical isolator has a function of rejecting the backward light, most lasers will employ a built-in optical isolator to isolate an interference of the backward light into the laser cavity. Consequently, through further employing the optical polarizer, a birefringent optical filter for monitoring the channel can be obtained. Furthermore, through appropriately designing the optical isolator and adjusting an orientation of the optical polarizer, the channel can be recognized via the spectral transmittance. Therefore, the channel can be correctly detected by the composition of optical elements described above.

In a DWDM (Dense Wavelength Division Multiplexing) system, the tunable laser is always utilized as a spare light source or a fast wavelength-switching device, and thus a monitoring module has to own abilities to monitor multiple wavelengths and fast response. The design according to the present invention appropriately utilizes the isolator having a birefringent characteristic and further cooperates with a linear polarizer to form a channel monitoring module. Thus, the module can easily adjust the orientation of the linear polarizer, or a phase-shifter and a polarization rotator can be set between the optical isolator and the linear polarizer for adjusting the spectral response of the monitored channel. The monitoring module according to the present invention also can be applied in a network and not be limited in monitoring the laser source.

Because most optical isolators are usually packaged with a birefringent optical crystal and the reflective index ($n_o$, $n_e$) of the material is wavelength dependent, after passing through the birefringent optical crystal, an incident light having a fixed linear polarization of 45 degrees will have different output polarization states corresponding to different wavelengths thereof. And, through further employing the linear polarizer, a spectral filter can be obtained. The present invention utilizes a spectral transmittance of the spectral filter for achieving a function of channel monitoring, and the optical isolator herein has a function of avoiding the laser or an optical amplifier to be interfered by the backward light. The Embodiments 1~6 described below are employed to explain the system in detail according to the present invention.

Embodiment 1

Figure 1:
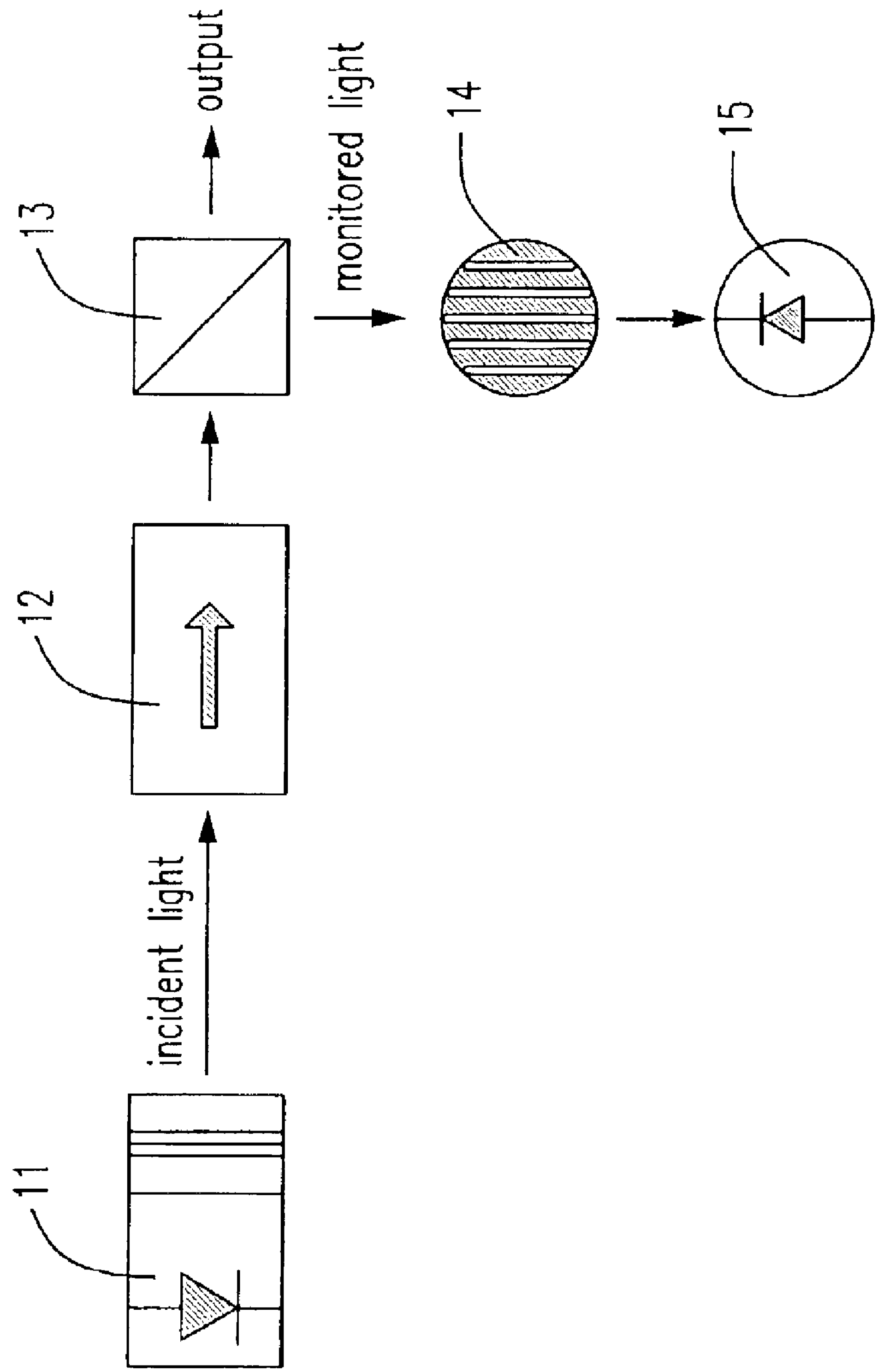
FIG. 1 is a schematic view of the framework of a simultaneous optical isolation and channel monitoring system in a first preferred embodiment according to the present invention.

Please refer to FIG. 1 which illustrates a schematic view of the framework of a simultaneous optical isolation and channel monitoring system in a first preferred embodiment according to the present invention. The system includes an optical isolator 12, a beam splitter 13, a linear polarizer 14, and a photodiode 15, wherein the optical isolator 12 receives an incident light generated by a tunable laser 11, and because of the wavelength variation of incident light, a different output polarization state will be generated after passing through the optical isolator 12. Besides, the optical isolator 12 further has a function of rejecting the interference of backward light into the cavity of laser source or an optical amplifier.

When the incident light passes through the optical isolator 12 and then arrives the beam splitter 13, the light will be separated into a light to output and a light for monitoring signal through the beam splitter 13, such as in the ratio 90:10. The output as the light output of the system according to the present invention, and the monitored light is used for monitoring. Thus, the monitored light further transmits to the linear polarizer 14, and a portion of signal (which can be horizontal or vertical polarization, or has an arbitrary orientation of polarization) filtered by the linear polarizer 14 will be detected by the photodiode 15 so as to monitor the channel.

Figure 7:
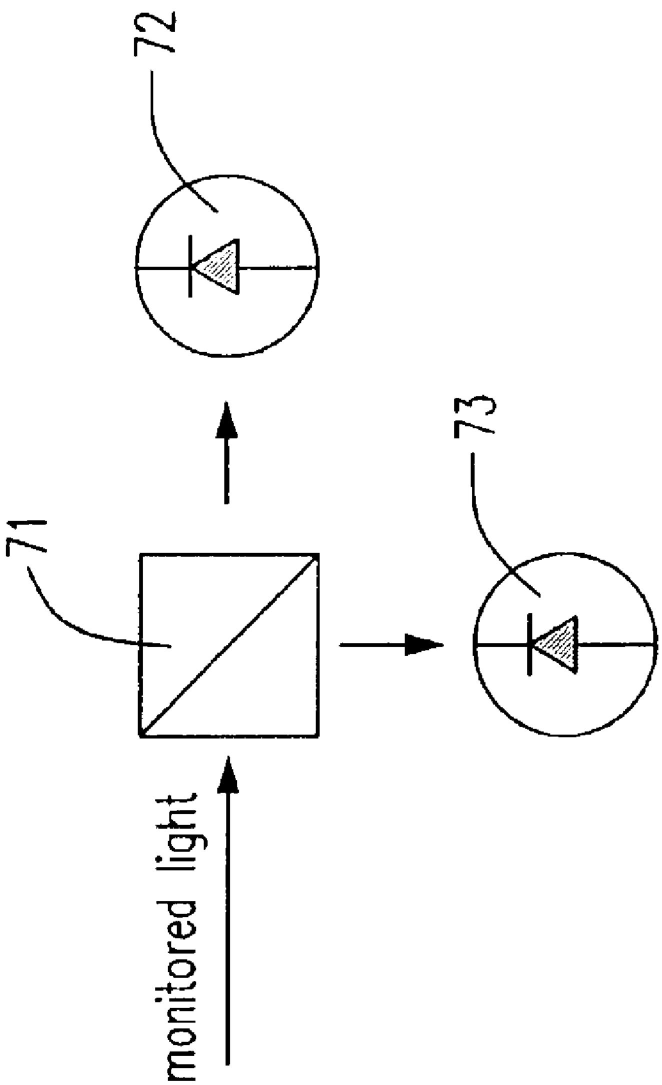
FIG. 7 is a schematic view of a system employing a polarization beam splitter according to the present invention.

The optical isolator 12 described above has a birefringent characteristic. The combination of the linear polarizer 14 and the photodiode 15 can be replaced by another combination of a polarization beam splitter 71 and two photodiodes 72 and 73 so as to form another type, as shown in FIG. 7. Furthermore, when a polarization controller or a combination of a polarization controller and a linear polarizer is set in front of the optical isolator 12, the present invention can be applied in the OADM network and a receiver end.

Embodiment 2

Figure 2:
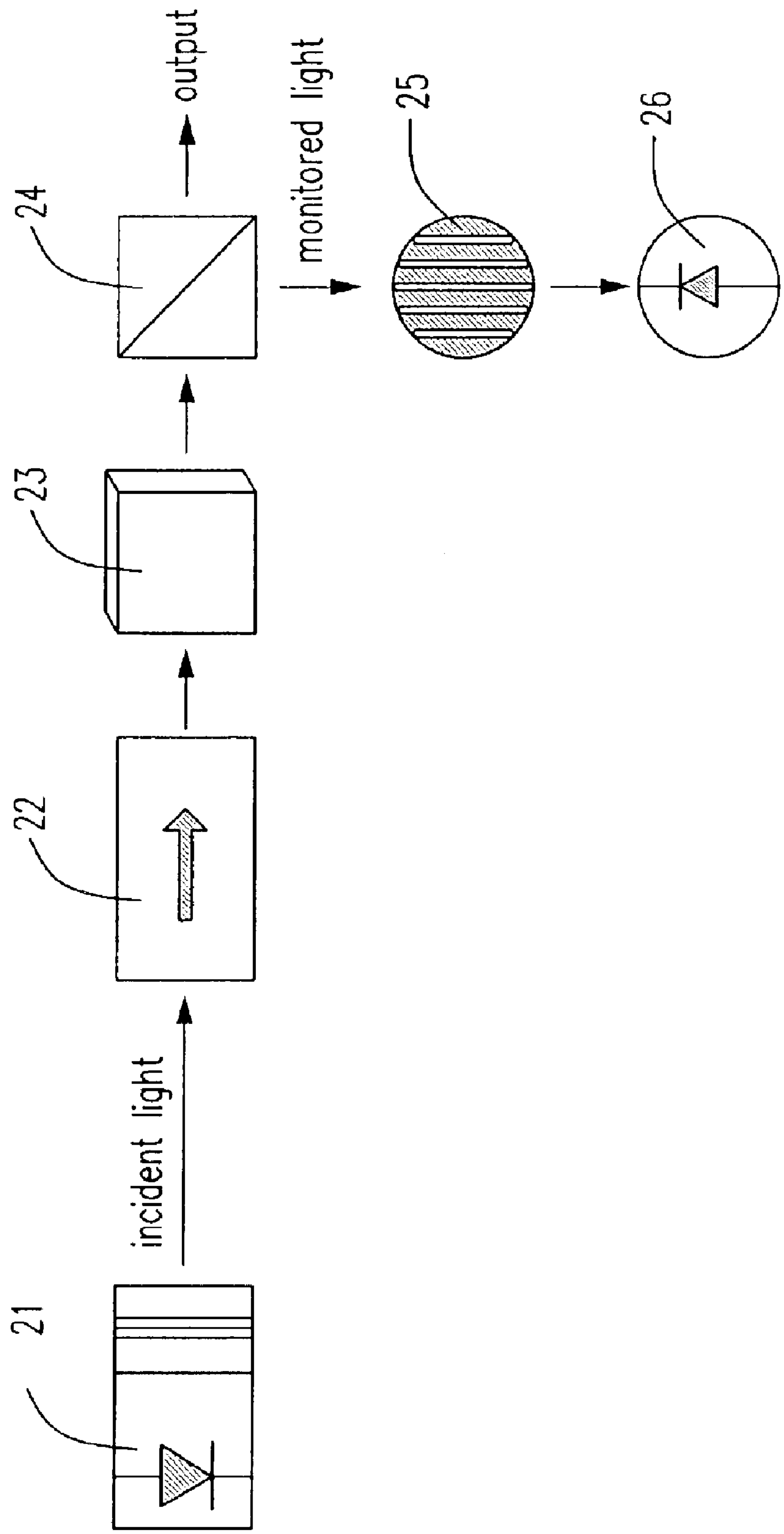
FIG. 2 is a schematic view of the framework of a simultaneous optical isolation and channel monitoring system in a second preferred embodiment according to the present invention.

Please refer to FIG. 2 which illustrates a schematic view of the framework of a simultaneous optical isolation and channel monitoring system in a second preferred embodiment according to the present invention. The system includes an optical isolator 22, a wave plate 23, a beam splitter 24, a linear polarizer 25, and a photodiode 26, wherein the optical isolator 22 receives an incident light generated by a tunable laser 21, and because of the wavelength variation of incident light, a different output polarization state will be generated after passing through the optical isolator 22. Besides, the optical isolator 22 further has a function of rejecting the interference of backward light into the cavity of laser source or an optical amplifier.

When the incident light passes through the optical isolator 22 and the wave plate 23, the light will be separated into a light to output and a light for monitoring signal through the beam splitter 24, such as in the ratio 90:10. The output as the light output of the system according to the present invention, and the monitored light is used for monitoring. Thus, the monitored light further transmits to the linear polarizer 25, and a portion of signal (which can be horizontal or vertical polarization, or has an arbitrary orientation of polarization) filtered by the linear polarizer 25 will be detected by the photodiode 26 so as to monitor the channel. Moreover, the wave plate 23 herein is utilized to amend the monitored waveband and spectral characteristic.

The optical isolator 22 described above has a birefringent characteristic. The combination of the linear polarizer 25 and the photodiode 26 can be replaced by another combination of a polarization beam splitter 71 and two photodiodes 72 and 73 so as to form another type shown in FIG. 7. Furthermore, when a polarization controller or a combination of a polarization controller and a linear polarizer is set in front of the optical isolator 22, the present invention can be applied in the OADM network and a receiver end.

Embodiment 3

Figure 3:
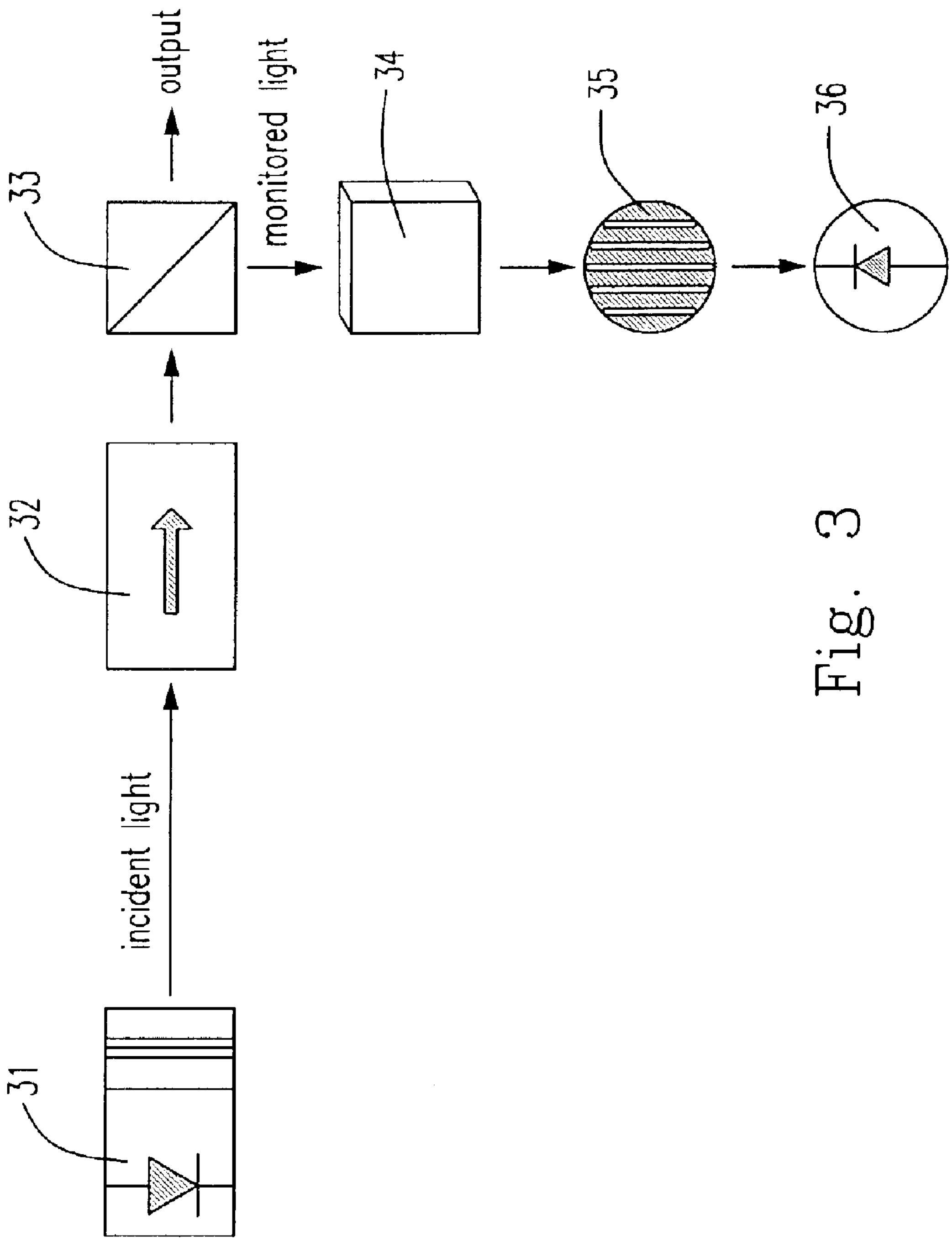
FIG. 3 is a schematic view of the framework of a simultaneous optical isolation and channel monitoring system in a third preferred embodiment according to the present invention.

Please refer to FIG. 3 which illustrates a schematic view of the framework of a simultaneous optical isolation and channel monitoring system in a third preferred embodiment according to the present invention. The system includes an optical isolator 32, a beam splitter 33, a wave plate 34, a linear polarizer 35, and a photodiode 36, wherein the optical isolator 32 receives an incident light generated by a tunable laser 31, and because of the wavelength variation of incident light, a different output polarization state will be generated after passing through the optical isolator 32. Besides, the optical isolator 32 further has a function of rejecting the interference of backward light into the cavity of laser source or an optical amplifier.

When the incident light passes through the optical isolator 32 and then arrives the beam splitter 33, the light will be separated into a light to output and a light for monitoring signal through the beam splitter 33, such as in the ratio 90:10. The output as the light output of the system according to the present invention, and the monitored light is used for monitoring. Thus, the monitored light further transmits to the wave plate 34 for amending the monitored waveband and spectral characteristic thereof. The linear polarizer 35 is connected to the wave plate 34 for filtering a portion of signal (which can be horizontal or vertical polarization, or has an arbitrary orientation of polarization) which will be detected by the photodiode 36 so as to monitor the channel.

The optical isolator 32 described above has a birefringent characteristic. The combination of the linear polarizer 35 and the photodiode 36 can be replaced by another combination of a polarization beam splitter 71 and two photodiodes 72 and 73 so as to form the embodiment shown in FIG. 7. Furthermore, when a polarization controller or a combination of a polarization controller and a linear polarizer is set in front of the optical isolator 32, the present invention can be applied in the OADM network and a receiver end.

Embodiment 4

Figure 4:
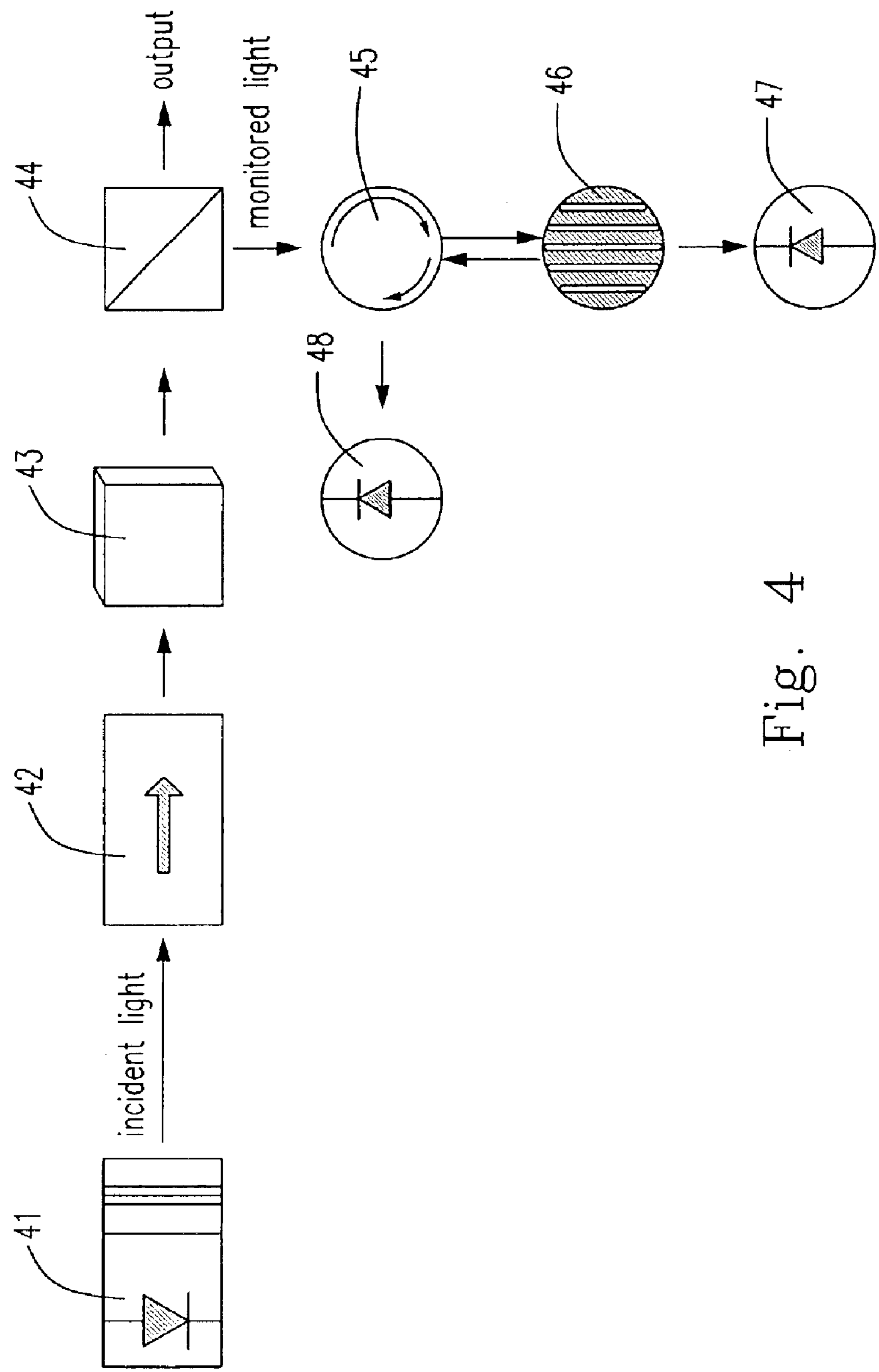
FIG. 4 is a schematic view of the framework of a simultaneous optical isolation and channel monitoring system in a fourth preferred embodiment according to the present invention.

Please refer to FIG. 4 which illustrates a schematic view of the framework of a simultaneous optical isolation and channel monitoring system in a fourth preferred embodiment according to the present invention and only replace the linear polarizer and the photodiode in FIG. 2 with an optical circulator, a reflective linear polarizer and two photodiodes. The main function of this embodiment is to separate the monitored light into two rays of orthogonal polarizations so that the system according to the present invention can be applied in more fields. The system includes an optical isolator 42, a wave plate 43, a beam splitter 44, an optical circulator 45, a first photodiode 47 and a second photodiode 48, wherein the optical isolator 42 receives an incident light generated by a tunable laser 41, and because of the wavelength variation of incident light, a different output polarization state will be generated after passing through the optical isolator 42. Besides, the optical isolator 42 further has a function of rejecting the interference of backward light into the cavity of laser source an optical amplifier.

When the incident light passes through the optical isolator 42 and the wave plate 43 and then transmits to the beam splitter 44, the light will be separated into a light to output and a light for monitoring signal through the beam splitter 44, such as in the ratio 90:10. The output as the light output of the system according to the present invention, and the monitored light is used for monitoring. Thus, the monitored light further transmits to the optical circulator 45, and the monitored light will be separated into a first quantity of signal (which can be horizontal or vertical polarization, or has an arbitrary orientation of polarization) and a second quantity of signal (which can be the orthogonal polarization relative to a first quantity). The first polarization ray will be detected by the first photodiode 47 and the second polarization ray will be detected by the second photodiode 48 so as to monitor the channel. Moreover, the wave plate 43 herein is utilized to amend the monitored waveband and spectral characteristic.

The optical isolator 42 described above has a birefringent characteristic. And, a reflective linear polarizer 46 can further be set between the optical circulator 45 and the first photodiode 47. Furthermore, when a polarization controller or a combination of a polarization controller and a linear polarizer is set in front of the optical isolator 42, the present invention can be applied in the OADM network and a receiver end.

Embodiment 5

Figure 5:
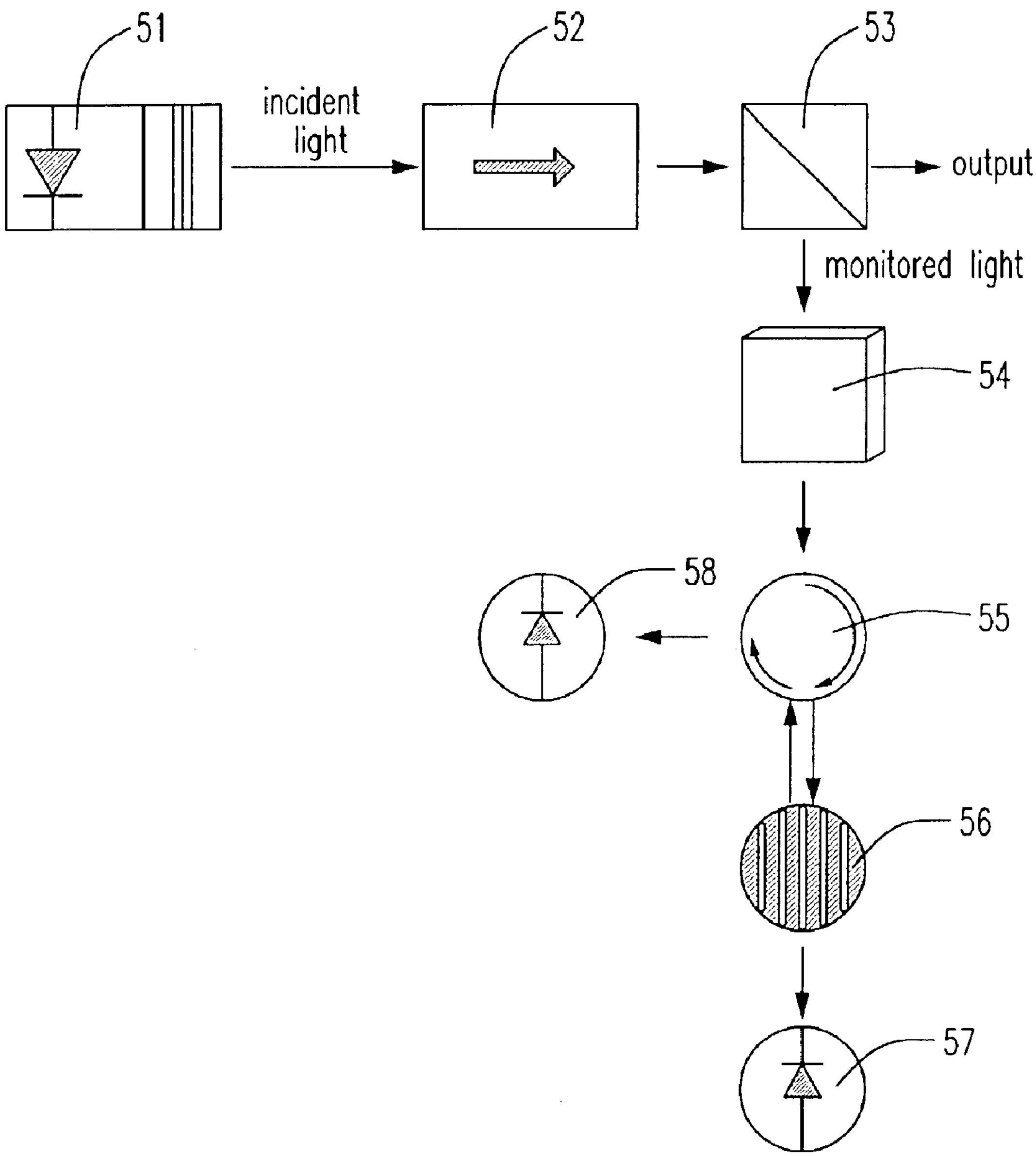
FIG. 5 is a schematic view of the framework of a simultaneous optical isolation and channel monitoring system in a fifth preferred embodiment according to the present invention.

Please refer to FIG. 5 which illustrates a schematic view of the framework of a simultaneous optical isolation and channel monitoring system in a fifth preferred embodiment according to the present invention and only replace the linear polarizer and the photodiode in FIG. 3 with an optical circulator, a reflective linear polarizer and two photodiodes. The main function of this embodiment is to separate the monitored light into two rays of orthogonal polarizations so that the system according to the present invention can be applied in more fields. The system includes an optical isolator 52, a beam splitter 53, a wave plate 54, an optical circulator 55, a first photodiode 57, and a second photodiode 58, wherein the optical isolator 52 receives an incident light generated by a tunable laser 51, and because of the wavelength variation of incident light, a different output polarization state will be generated after passing through the optical isolator 52. Besides, the optical isolator 52 further has a function of rejecting the interference of backward light into the cavity of laser source or an optical amplifier.

When the incident light passes through the optical isolator 52 and then arrives the beam splitter 53, the light input will be separated into a light to output and a light for monitoring signal through the beam splitter 53, such as in the ratio 90:10. The output as the light output of the system according to the present invention, and the monitored light is used for monitoring. Thus, the monitored light further transmits to the wave plate 54 for amending the monitored waveband and spectral characteristic thereof. The optical circulator 55 is connected to the wave plate 54 for separating the monitored light into a first quantity of signal (which can be horizontal or vertical polarization, or has an arbitrary orientation of polarization) and a second quantity of signal (which can be the orthogonal polarization relative to a first quantity). The first polarization ray will be detected by the first photodiode 57 and the second polarization ray will be detected by the second photodiode 58 so as to monitor the channel.

The optical isolator 52 described above has a birefringent characteristic and the wave plate 54 can be replaced by a phase-shifter or a polarization rotator. And, a reflective linear polarizer 56 can further be set between the optical circulator 55 and the first photodiode 57. Furthermore, when a polarization controller or a combination of a polarization controller and a linear polarizer is set in front of the optical isolator 52, the present invention can be applied in the OADM network and a receiver end.

Embodiment 6

Figure 6:
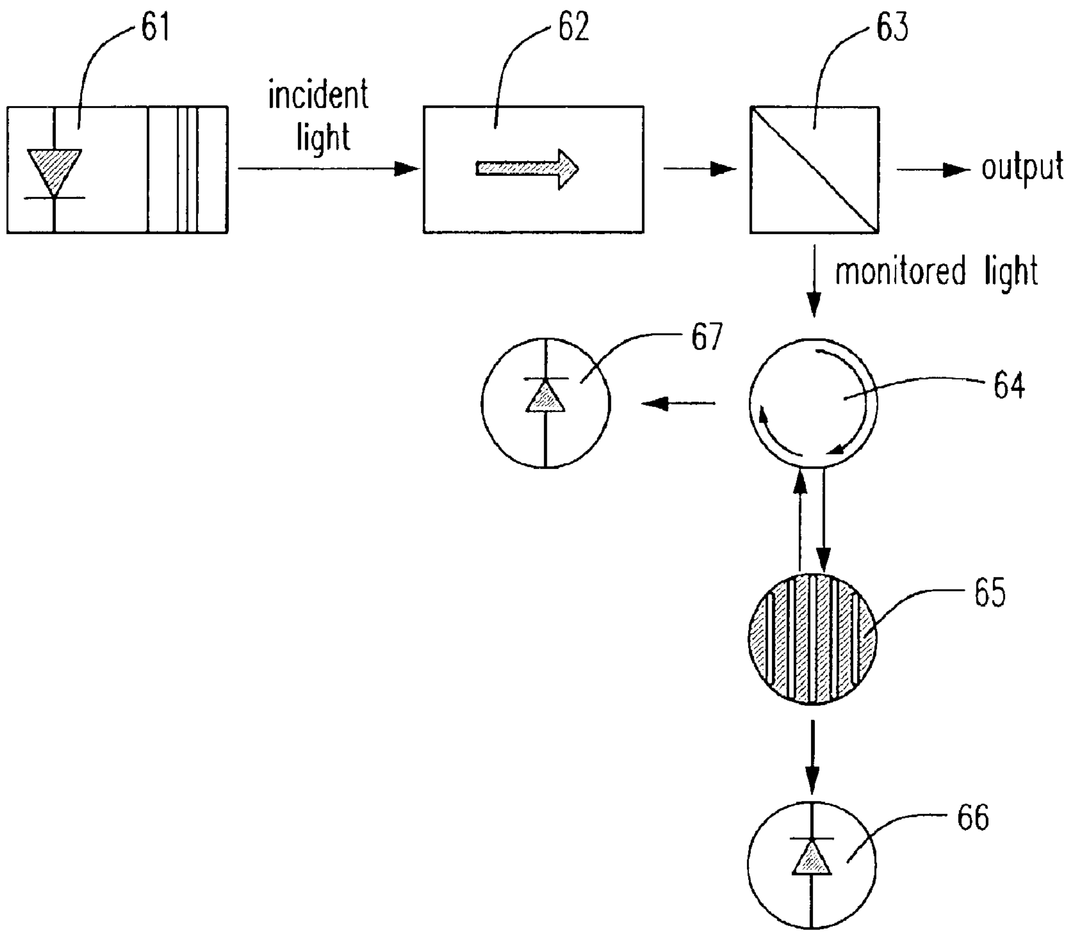
FIG. 6 is a schematic view of the framework of a simultaneous optical isolation and channel monitoring system in a sixth preferred embodiment according to the present invention.

Please refer to FIG. 6 which illustrates a schematic view of the framework of a simultaneous optical isolation and channel monitoring system in a sixth preferred embodiment according to the present invention and is a simpler embodiment according to FIG. 5 through omitting the wave plate. The system includes an optical isolator 62, a beam splitter 63, an optical circulator 64, a first photodiode 66, and a second photodiode 67, wherein the optical isolator 62 receives an incident light generated by a tunable laser 61, and because of the wavelength variation of incident light, a different output polarization state will be generated after passing through the optical isolator 62. Besides, the optical isolator 62 further has a function of rejecting the interference of backward light into the cavity of laser source or an optical amplifier.

When the incident light passes through the optical isolator 62 and then arrives the beam splitter 63, the light will be separated into a light to output and a light for monitoring signal through the beam splitter 63, such as in the ratio 90:10. The output as the light output of the system according to the present invention, and the monitored light is used for monitoring. Thus, the monitored light further transmits to the optical circulator 64 for being separated into a first quantity of signal (which can be horizontal or vertical polarization, or has an arbitrary orientation of polarization) and a second quantity of signal (which can be the orthogonal polarization relative to a first quantity). The first polarization ray will be detected by the first photodiode 66 and the second polarization ray will be detected by the second photodiode 67 so as to monitor the channel.

The optical isolator 62 described above has a birefringent characteristic. And, a reflective linear polarizer 65 can further be set between the optical circulator 64 and the first photodiode 66. Furthermore, when a polarization controller or a combination of a polarization controller and a linear polarizer is set in front of the optical isolator 62, the present invention can be applied in the OADM network and a receiver end.

Figure 8:
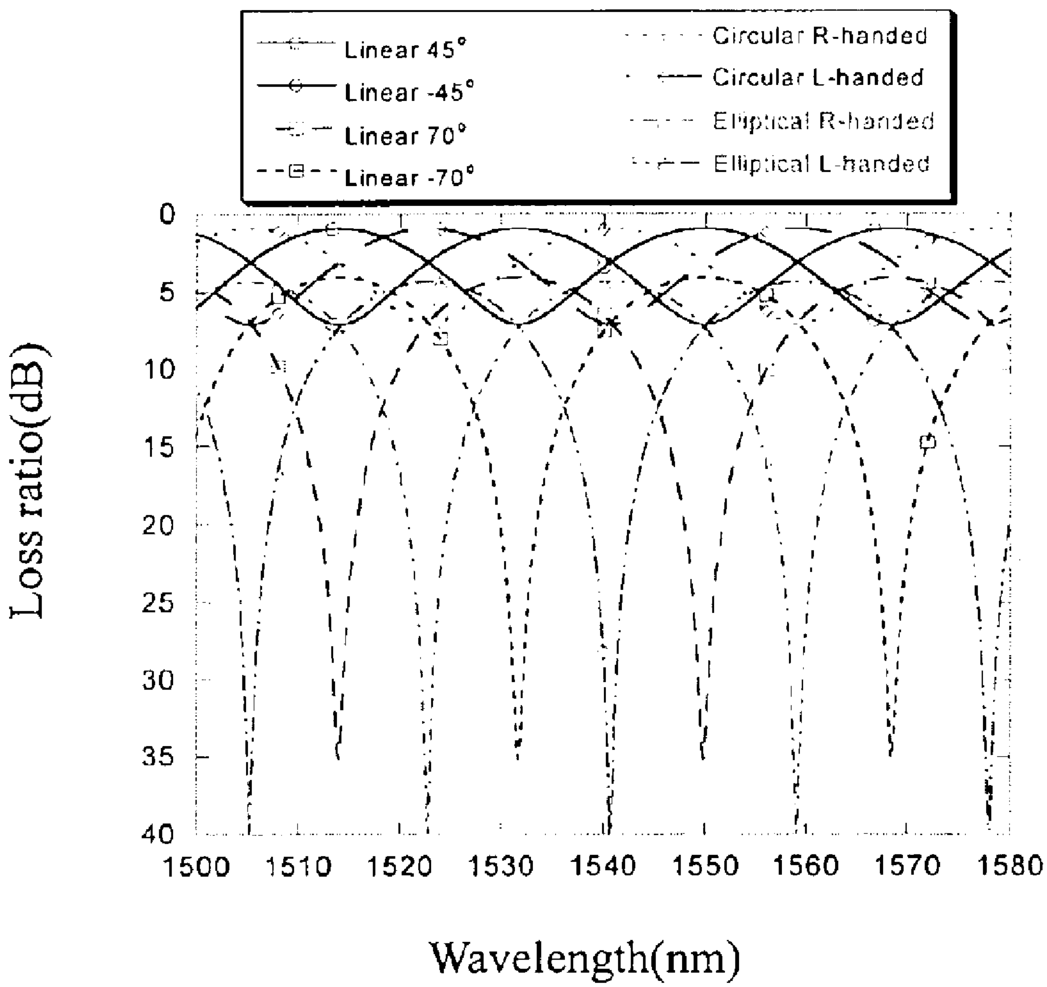
FIG. 8 is a comparative plot of the spectral response of a system according to the present invention under different polarization states of incident light when a linear polarizer has an orientation angle of 19 degrees.

Please refer to FIG. 8 which shows a comparative plot of the spectral response of a system according to the present invention under different input polarization states when a linear polarizer has an orientation angle of 19 degrees. As shown in FIG. 8, the spectral response is changing with the input polarization state.

Figure 9:
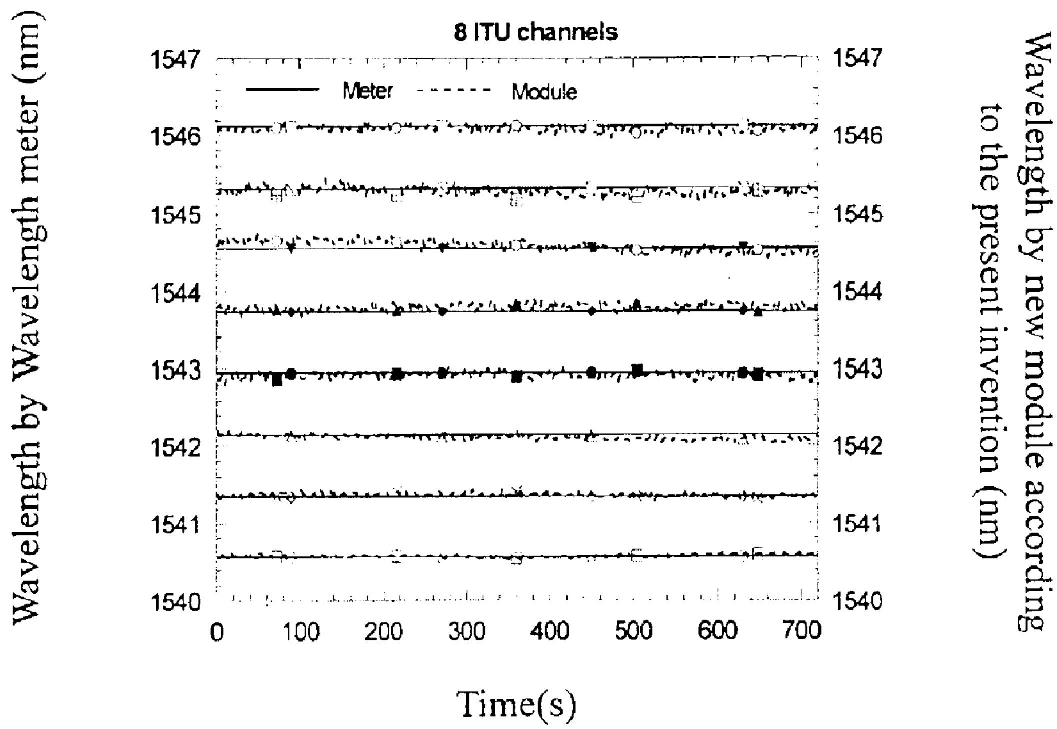
FIG. 9 is a monitoring plot of eight ITU channels and each channel is in every twelve minutes.

FIG. 9 is a monitoring plot of eight ITU channels and each channel is in every twelve minutes. In this experiment, a wavelength meter (accuracy=5 pm) is employed to measure the output light for comparing with the new module according to the present invention. As shown in FIG. 9, the results of the eight channels monitored by the wavelength meter and by the new module according to the present invention are highly identical. Moreover, the eight channels shown in the plot are all distinguishable and not mixed, and thus the present invention can clearly identify the eight channels. Furthermore, after monitoring a period of time, the measuring result of each individual channel maintains stably.

In view of the aforesaid, the present invention not only gives a consideration to the function of the available optical isolator, but also cooperates with the optical isolator having a birefringent characteristic with a linear polarizer for simultaneously monitoring the channel. Therefore, the present invention has a simple construction and a waveband thereof can be easily adjusted. Consequently, the present invention can efficiently recover defects in the prior arts and is industrial valuable.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A simultaneous optical isolation and channel monitoring system for monitoring a channel of an incident light, comprising:

an optical isolator for receiving said incident light so as to isolate an interference of backward light, wherein after passing through said optical isolator, said incident light has a different polarization state output changing with a wavelength thereof;

a beam splitter connected to said optical isolator for separating said incident light into a light to output and a monitored light;

a polarization beam splitter connected to said beam splitter for filtering two quantities of signals from said monitored light; and two photodetectors connected to said polarization beam splitter for detecting said two quantities of signals generated from said monitored light so as to monitor said channel.

2. The system according to claim 1, wherein said two photodetectors are respectively a photodiode.

3. A system of simultaneous optical isolation and channel monitor for monitoring a channel of an incident light, comprising:

an optical isolator for receiving said incident light so as to isolate an interference of backward light;

a wave plate connected to said optical isolator to modify a waveband and a spectral characteristic of said incident light;

a beam splitter connected to said wave plate for separating said incident light into a light to output and a monitored light;

a linear polarizer connected to said beam splitter for filtering a quantity of signal from said monitored light; and a photodetector connected to said linear polarizer for detecting said quantity of signal generated from said monitored light so as to monitor said channel.

4. The system according to claim 3, wherein after said incident light passes through said optical isolator, said incident light has a different polarization state output changing with a wavelength thereof.

5. A system of simultaneous optical isolation and channel monitor for monitoring a channel of an incident light, comprising:

an optical isolator for receiving said incident light so as to isolate an interference of backward light;

a beam splitter connected to said optical isolator for separating said incident light into a light to output and a monitored light;

at least one of a phase-shifter and a polarization rotator connected to said beam splitter to modify a waveband and a spectral characteristic of said monitored light;

a linear polarizer connected to said at least one of the phase-shifter and the polarization rotator for filtering a quantity of signal from said monitored light; and a photodetector connected to said linear polarizer for detecting said quantity of signal generated from said monitored light so as to monitor said channel.

6. A simultaneous optical isolation and channel monitoring system for monitoring a channel of an incident light, comprising:

an optical isolator for receiving said incident light so as to isolate an interference of backward light;

a beam splitter connected to said optical isolator for separating said incident light into a light to output and a monitored light;

an optical circulator connected to said beam splitter for filtering a first quantity of signal and a second quantity of signal from said monitored light;

a first photodetector connected to said optical circulator for detecting said first quantity of signal from said monitored light so as to monitor said channel; and a second photodetector connected to said optical circulator for detecting said second quantity of signal from said monitored light so as to monitor said channel.

7. The system according to claim 6 further comprising a wave plate set in front or said beam splitter to modify a waveband and a spectral characteristic of said incident light.

8. The system according to claim 6 further comprising a wave plate set in back of said beam splitter to modify a waveband and spectral characteristic of said monitored light.

9. The system according to claim 6 further comprising a reflective linear polarizer set between said optical circulator and said first photodetector.

10. The system according to claim 6, wherein said first photodetector is a photodiode.

11. The system according to claim 6, wherein said second photodetector is a photodiode.

* * * * *